(12) United States Patent
Yarlagadda et al.

(10) Patent No.: US 7,095,733 B1
(45) Date of Patent: Aug. 22, 2006

(54) VOICE INTEGRATED VOIP SYSTEM

(75) Inventors: Madhu Yarlagadda, San Jose, CA (US); Patrick Loo, Fremont, CA (US); David H. Nakayama, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1020 days.

(21) Appl. No.: 09/658,771

(22) Filed: Sep. 11, 2000

(51) Int. Cl.
*H04L 12/66* (2006.01)

(52) U.S. Cl. ............... 370/352; 370/356; 370/401; 370/463; 370/465; 370/466; 718/103; 718/107

(58) Field of Classification Search ........... 370/352, 370/356, 465, 466, 401, 463, 235; 718/103, 718/107
See application file for complete search history.

(56) References Cited

U.S. PATENT DOCUMENTS

| | | | |
|---|---|---|---|
| 5,333,266 A | 7/1994 | Boaz et al. | |
| 5,497,373 A | 3/1996 | Hulen et al. | |
| 5,592,480 A | 1/1997 | Carney et al. | |
| 5,647,002 A | 7/1997 | Brunson | |
| 5,809,128 A | 9/1998 | McMullin | |
| 5,872,926 A | 2/1999 | Levac et al. | |
| 5,884,262 A * | 3/1999 | Wise et al. | 704/270.1 |
| 5,951,638 A | 9/1999 | Hoss et al. | |
| 5,983,227 A | 11/1999 | Nazem et al. | |
| 6,055,240 A | 4/2000 | Tunnicliffe | |
| 6,061,347 A | 5/2000 | Hollatz et al. | |
| 6,078,886 A | 6/2000 | Dragosh et al. | |
| 6,137,864 A | 10/2000 | Yaker | |
| 6,141,341 A * | 10/2000 | Jones et al. | 370/352 |
| 6,144,667 A | 11/2000 | Doshi et al. | |
| 6,175,858 B1 | 1/2001 | Bulfer et al. | |
| 6,181,781 B1 | 1/2001 | Porter et al. | |
| 6,185,565 B1 | 2/2001 | Meubus et al. | |
| 6,230,190 B1 | 5/2001 | Edmonds et al. | |
| 6,233,318 B1 | 5/2001 | Picard et al. | |
| 6,240,448 B1 | 5/2001 | Imielinski et al. | |
| 6,246,758 B1 | 6/2001 | Low et al. | |
| 6,269,095 B1 * | 7/2001 | Neubauer et al. | 370/352 |
| 6,269,336 B1 * | 7/2001 | Ladd et al. | 704/270 |
| 6,282,192 B1 | 8/2001 | Murphy et al. | |
| 6,282,270 B1 | 8/2001 | Porter | |
| 6,292,480 B1 | 9/2001 | May | |
| 6,301,245 B1 | 10/2001 | Luzeski et al. | |
| 6,446,127 B1 * | 9/2002 | Schuster et al. | 709/227 |
| 6,456,967 B1 * | 9/2002 | Yeom | 704/220 |
| 6,584,110 B1 * | 6/2003 | Mizuta et al. | 370/401 |
| 6,654,456 B1 * | 11/2003 | Mandalia et al. | 379/220.01 |
| 2001/0030958 A1 | 10/2001 | Kichise | |

FOREIGN PATENT DOCUMENTS

WO      99/28480      12/1999

* cited by examiner

*Primary Examiner*—Seema S. Rao
*Assistant Examiner*—Kevin Mew
(74) *Attorney, Agent, or Firm*—Brian N. Young; Townsend and Townsend and Crew, LLP

(57) ABSTRACT

An integrated VoIP unified message processing system includes a voice platform that processes data in native VoIP format. There is no use of hardware telephone interface cards (TICs) or software transcoding to transform data to PCM or other formats. Cost reductions are achieved by the elimination of expensive dedicated hardware and scalability is achieved by obviating the need for software transcoding.

7 Claims, 9 Drawing Sheets

VOICE INTEGRATED VOIP SYSTEM

CROSS-REFERENCES TO RELATED APPLICATIONS

This application is related to and claims the benefit of co-pending applications No. 09/658,781, entitled "Intelligent Voice Bridging"; No. 09/658,802, entitled "Intelligent Voice Converter"; and No. 09/659,233, entitled "Message Store Architecture", all filed Sep. 11, 2000, the disclosures of which are incorporated herein by reference.

BACKGROUND OF THE INVENTION

The present invention relates generally to the field of telecommunications application platforms or servers and more specifically to providing a gateway access server that provides telephony services and information retrieval service over a voice over IP (VOIP) network with out using any hardware cards commonly referred to as TICs (Telephony Interface Cards) and which is scalable to handle many users simultaneously.

Telecommunication application servers that provide telephony services and information retrieval service are known, however most of them use traditional PSTN (Public Switch Telephony Network) infrastructure to provide such service using various types of signaling mechanisms like T1, E1, SS7, etc.

Most recently there are some systems that provide similar service over the voice over IP (VOIP) networks. All of these systems use telephony interface cards to connect to either the PSTN or the VOIP network. An overview of a typical system is depicted in FIG. 1.

There are other systems that provide limited functionality like PC to PC and PC to phone communication services using software only model however these systems are not scalable because they perform transcode operation using the software model.

Transcoding is the process of converting one voice data format to another. All of the existing systems interact with the VOIP network using network supported CODEC format like G723.1 or G729 etc., however they a perform transcode operation on the data to convert it into either standard PCM, Mu-LAW and/or A-LAW before the application can handle the data. The cost of a phone call on a PSTN costs about 7 to 10 cents a minute while the cost of a phone call on a VoIP network has been reduced to about 1 cent a minute. Transcoding is computationally intensive operation required to be done by a special hardware device called a TIC (Telephony Interface Cards) for scalability reasons. When transcoding is done in software the system is not scalable because the transcoding operation ties up large amounts of resources. There are also systems that perform transcoding in a batch mode in a non real-time bases, i.e. offline batch processing. However this approach does not provide instant/ real-time access to information until the transcode operation is complete. In some of the systems the message store stores multiple formats of the same data, one format for the VOIP/PSTN network and another format for access through the web. However such systems are either storage intensive, CPU intensive, or non-real-real-time oriented and cannot scale to a very large user base nor be used to provide synchronized data between the web and the telephone network.

Web portals, such as Yahoo, the assignee of the present application, receive millions of visits per day. Accordingly standard VoIP interfacing techniques such a TICs or software transcoding add cost and complexity to implementing telephony access to services normally provided by a web browser. As is well-known, revenue generation in e-commerce is often not linked to the services provided so the cost of providing these services must be carefully controlled. On the other hand the mobility and availability of telephones to potential visitees provides a tremendous business opportunity.

Because of the above constraints, a telecommunications application server that can provide functionality's like unified messaging, voice portal access to information and communication services must use specialized hardware such as TICs. Using specialized hardware limits the server to be developed only on a platform running operating system supported by the hardware vendor. Building such an scalable application server on a platform running a operating system like Free BSD UNIX that is not supported by the hardware vendor is not possible. Further, the cost of using TICs makes the cost of implementing such a telecommunications application server prohibitive.

From the above, it is apparent the improved systems for providing telephone access to various services now provided by the internet are needed.

SUMMARY OF THE INVENTION

According to one aspect of the invention, an improved telecommunication application server handles a wide variety of call control, messaging and information retrieval functionality using a software only model In one embodiment, a process is started which in turn has several threads, one for each telephony channel handled by the process. The number of threads per process is configurable, it is generally set to 24 or 30 similar to the number of channels handled by a traditional T1/E1 interface. Multiple processes can run on a single system. All the processes and threads share a large amount of shared memory that contains all of the system phrases/prompts, this minimizes the amount of delay in playing phrases.

According to another aspect of the invention, if the total number of channels i.e. simultaneous telephony subscribers becomes too great for one gateway access server to handle, the system is easily scaled by adding additional gateway access servers. Each telecommunication access server maintains its own copy of the phrases/prompt data in its shared memory. There is no need to have any communication between telecommunication access servers.

According to another aspect of the invention, data received in native VoIP format is processed without transcoding so that no hardware Telephone Interface Card (TIC) of software transcoding is required.

According to another aspect of the invention, data received from the VoIP network or to be transmitted on the VoIP network is stored in native VoIP format in the shared memory thereby increasing storage efficiency.

According to another aspect of the invention, text resources, such as email, may be accessed by telephone utilizing a text-to-speech converter (TTS) which outputs voice data in non-native VoIP format. A voice coder is utilized to transcode the output of the TTS to native VoIP format.

A further understanding of the nature and advantages of the invention herein may be realized by reference to the remaining portions of the specification and the attached drawings.

DESCRIPTION OF THE SPECIFIC EMBODIMENTS

A preferred embodiment of the invention will now be described with reference to the MyYahoo telephone interface being developed and implemented by the assignee of the present application. However, the invention is not limited to any particular implementation but has broad applicability for VOIP applications and provides many benefits which will be apparent from the following description. Users will access MyYahoo by dialing 1-800-MyYahoo from any telephone. MyYahoo will provide a universal message service including voice (such as phonemail), fax, and text (such as email). The users phone will be connected to MyYahoo servers via the internet and will use internet telephony, also known as Voice over IP (VoIP) protocols. The user requests information or services using the telephone and receives voice response generated by the MyYahoo servers.

Figure 1:
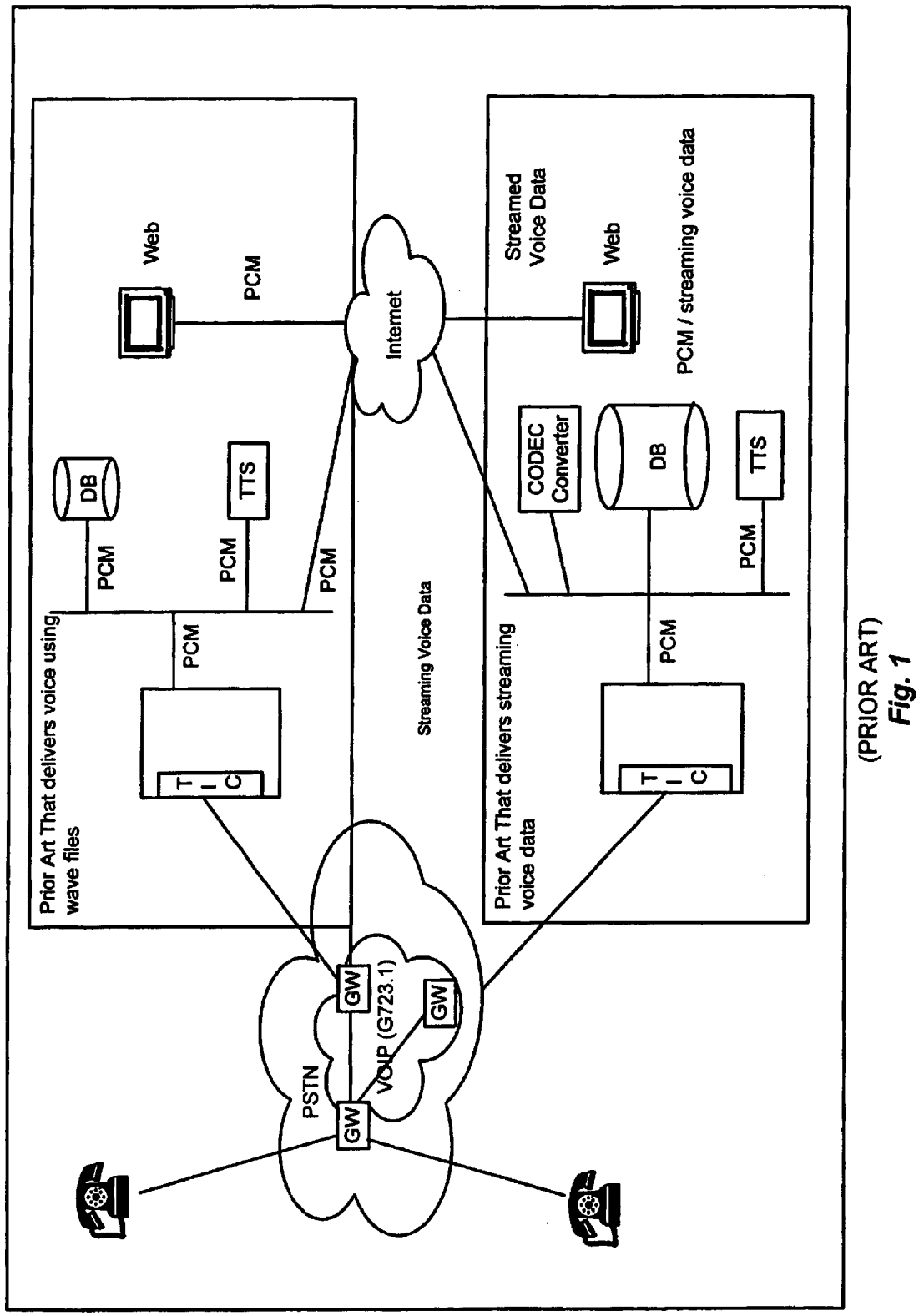
FIG. 1 is a block diagram of a typical prior art VoIP telecommunication system.
Figure 2:
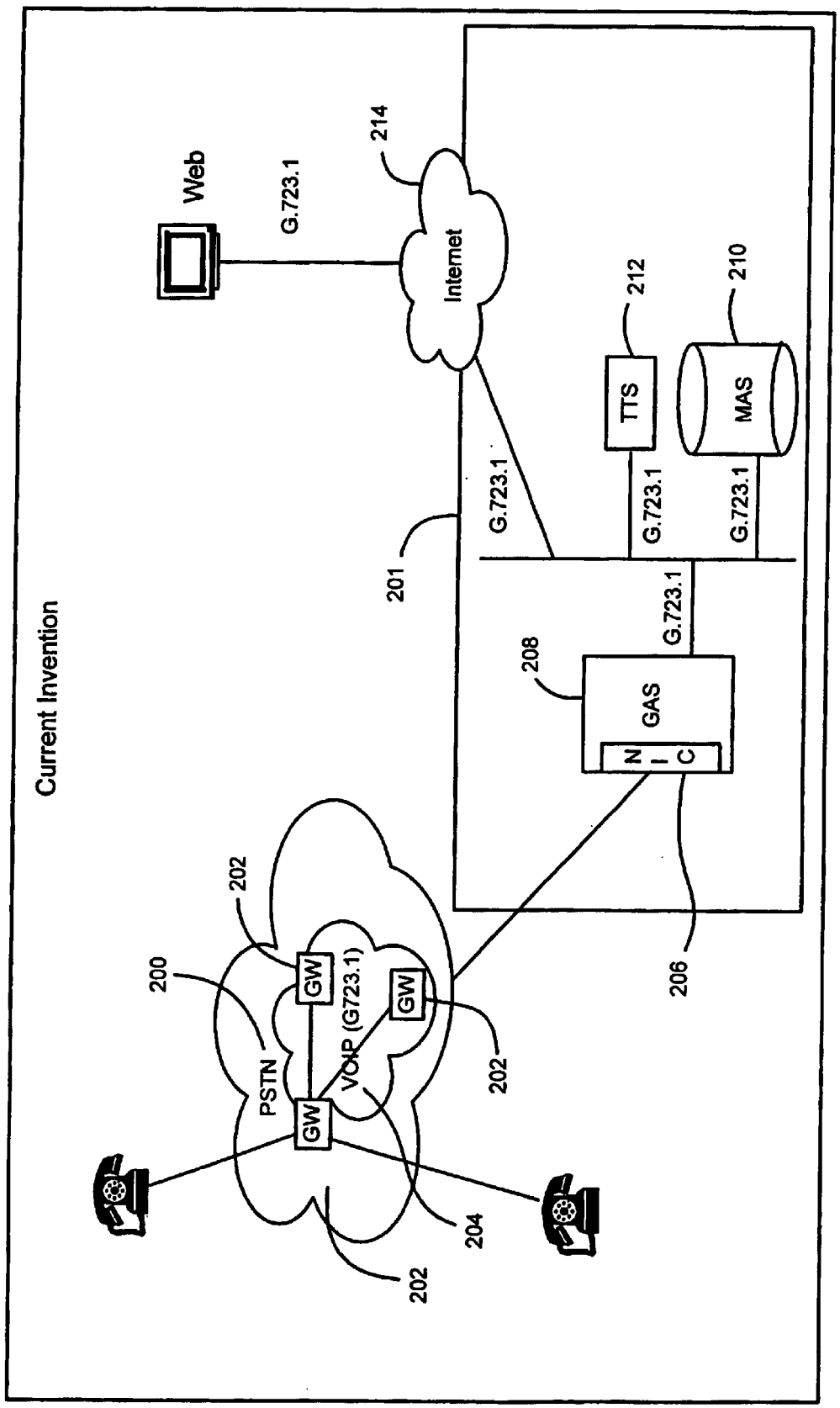
FIG. 2 is a block diagram of a preferred embodiment of the invention.

FIG. 2 depicts the connections of an embodiment of the present invention to a Public Switched Telephone Network 200 (PSTN). Gateways 202 connect the PSTN 200 to a VoIP network 204 and encode voice data in G.723.1 format which is encapsulated in IP packets. Although embodiments of the present invention are described using a G.723.1 format, it will be understood that other formats may be used and will be apprecicated by a person skilled in the art. A network interface card 206 (NIC) connects a server 208 of a VOIP system 201 to VoIP network 204. Software on the server 208 processes data in the G.723.1 native VoIP format so that the need for Telephony Interface Cards (TICs) or software transcoders is eliminated. Server 208 may interact with other servers over a G.723.1 native format. As shown, system 201 may include a Message Access Server (MAS) 210 and/or Text To Speech Server (TTS) 212 in one embodiment. Also, it will be understood that system 201 is not limited to the shown servers and other components may be included and are hereinafter described. System 201 is also connected to a communication medium 214, such as the Internet.

Figure 3:
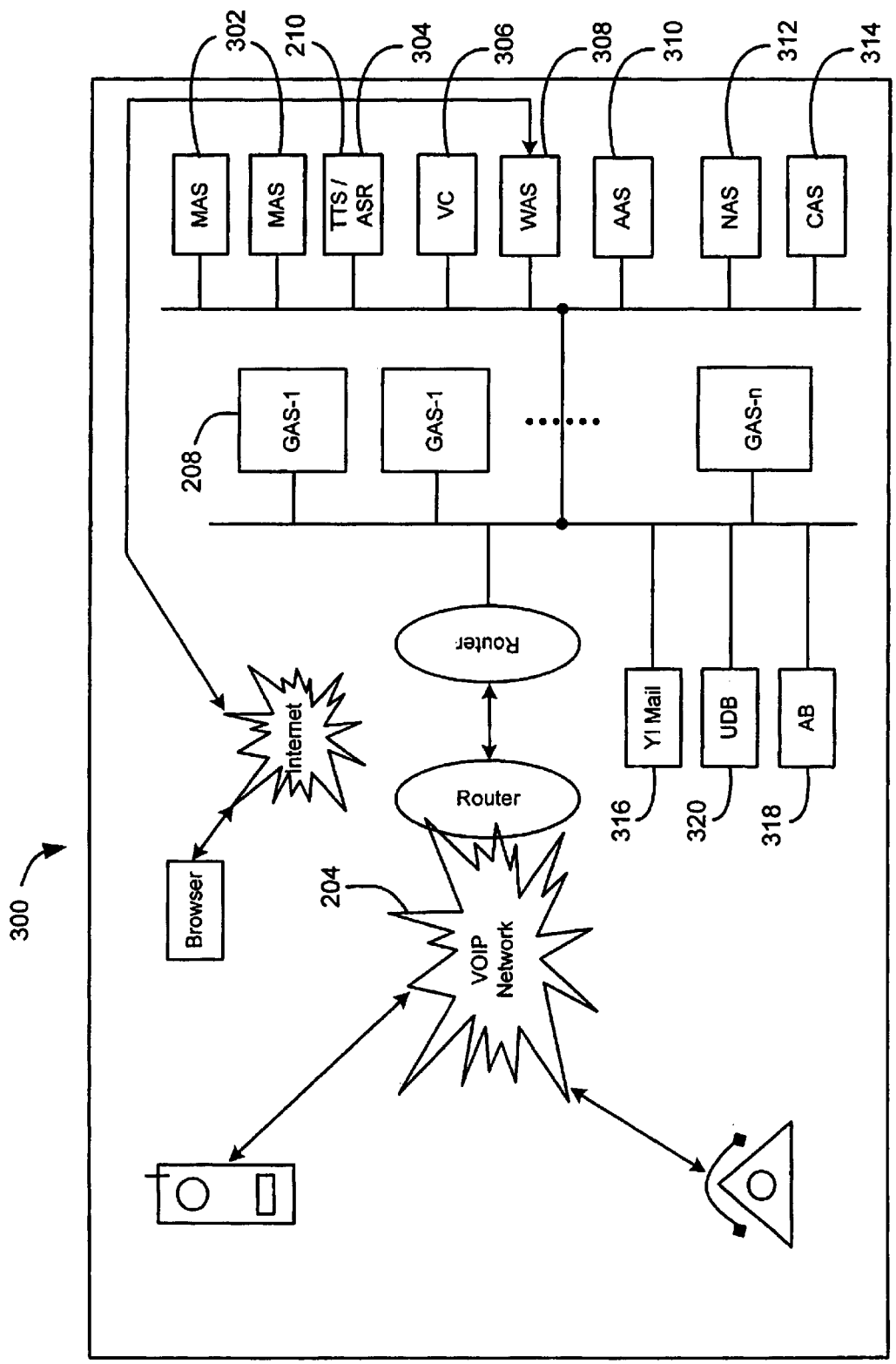
FIG. 3 is a block diagram depicting the architecture of a preferred embodiment of the voice services platform.
Figure 4:
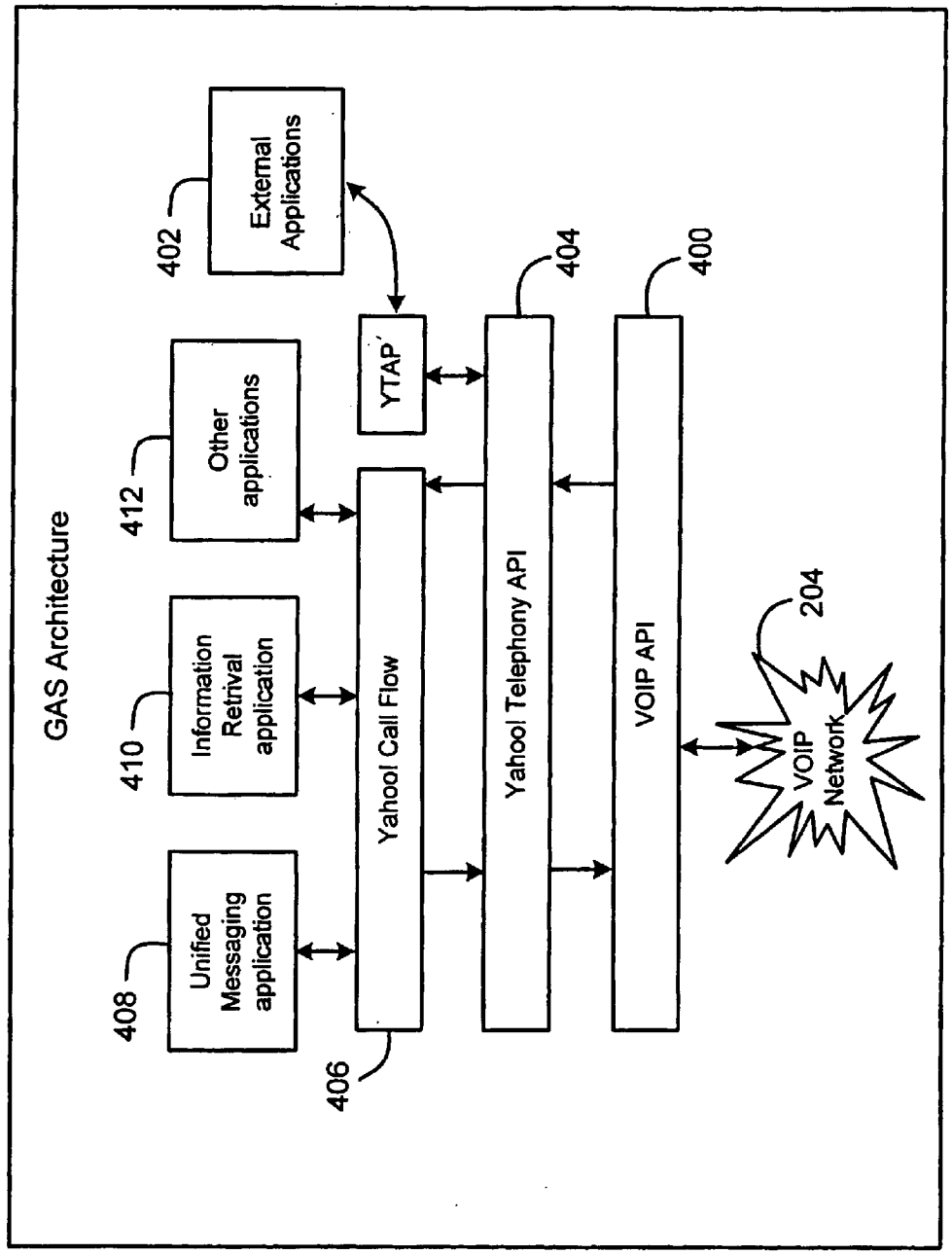
FIG. 4 is a block diagram depicting the architecture of a preferred embodiment of the gateway access server.

FIG. 3 shows an embodiment of a distributed client server system 300 that is used to provide telecommunication application services to callers/subscribers over a managed VOIP network 204. A preferred embodiment includes the following systems:

GAS 208 (Gateway Access Server): GAS 208 is the primary server that is connected to VOIP network 204 over a managed IP network link. GAS 208 implements the VOIP protocol and exposes it to the application call flow using an API called VOIP_API. GAS 208 module is further described in the later part of this section. The architecture of GAS 208 is depicted in FIG. 4. As shown, GAS 208 may include any number of servers, denoted as GAS-1–GAS-N.

The Call Flow interface provides a consistent application programming interface (API) that allows internal applications, such as email readers, voice mail applications, stock quote applications, etc., to obtain the services of GAS 208 and interface with the managed VOIP network 204.

Further, a telephone applications API provides a consistent interface for third parties to write applications to obtain the services provided by GAS 208 thus additionally enhancing the scalability of the system.

MAS 302 (Message Access Server): MAS 302 is responsible for the message store. Unlike traditional voice mail/application servers where the call flow application logic and message store are on a monolithic system. In this embodiment the message store is separated from GAS 208, which runs the call flow and application logic. This enables the provision a very large-scale system where a GAS 208 may access any of the message stores based on the user it is currently serving. System 300 is scalable so that multiple MASs 302 may be provided.

TTS 210 (Text To Speech Server): TTS server 210 is responsible for converting text into speech that may be played to the user. Some of the applications include providing the user with the capability of listening to email and other text based content from the phone.

ASR 304 (Automatic Speech Recognition): ASR server 304 is responsible for recognition of voice data sent to it and translating it to text that is sent back to the requester.

VC 306 (Voice Converter): VC 306 is a server that can convert one format of the voice into another.

WAS 308 (Web Access Server): WAS 308 enables the subscriber to retrieve their voice and fax messages from the web. It also provides registration service and billing information access service.

AAS 310 (Add Access Server): AAS 310 enables the call flow to have access to a set of advertisements so that it can target appropriate add for the subscriber.

NAS 312 (News Access Server): NAS 312 stores the latest news items in a manner that can be easily accessed and played to the caller.

CAS 314 (Content Access Server): CAS 314 provides access to content like stock quotes, weather information, sports information and customized content for the user based on My.Yahoo.com settings.

Y!Mail 316 (Yahoo Mail Servers): GAS 208 talks to the yahoo mail servers 316 to enable subscribers to listen to their email using the phone.

AB 318 (Address Book Server): GAS 208 talks to the yahoo address book server 318 so that subscribers of this service can send messages to anyone in their address book.

UDB 320 (User Data Base Server): UDB 320 stores the mapping between the user and MAS 302 that was allocated for that user.

The art of sending telecommunication data over managed VOIP networks is well known and will not be addressed in detail here. Essentially the user of this service will make a call to 1-800-MyYahoo. The network provider, i.e. carrier, will carry this call over their managed VOIP network 204 and will terminate the call into one of the gateway access servers 208 (GAS) that is available to handle the call. GAS 208 receives the OLI (Originating Line ID), i.e. caller ID information, and may decide if it wants to answer the call or reject the call. Using the OLI information avoids any abuse of this service.

GAS 208 performs standard TCP/IP such as receiving packets, extracting data from packets received, and encapsulating data into packets to be sent.

Figure 5:
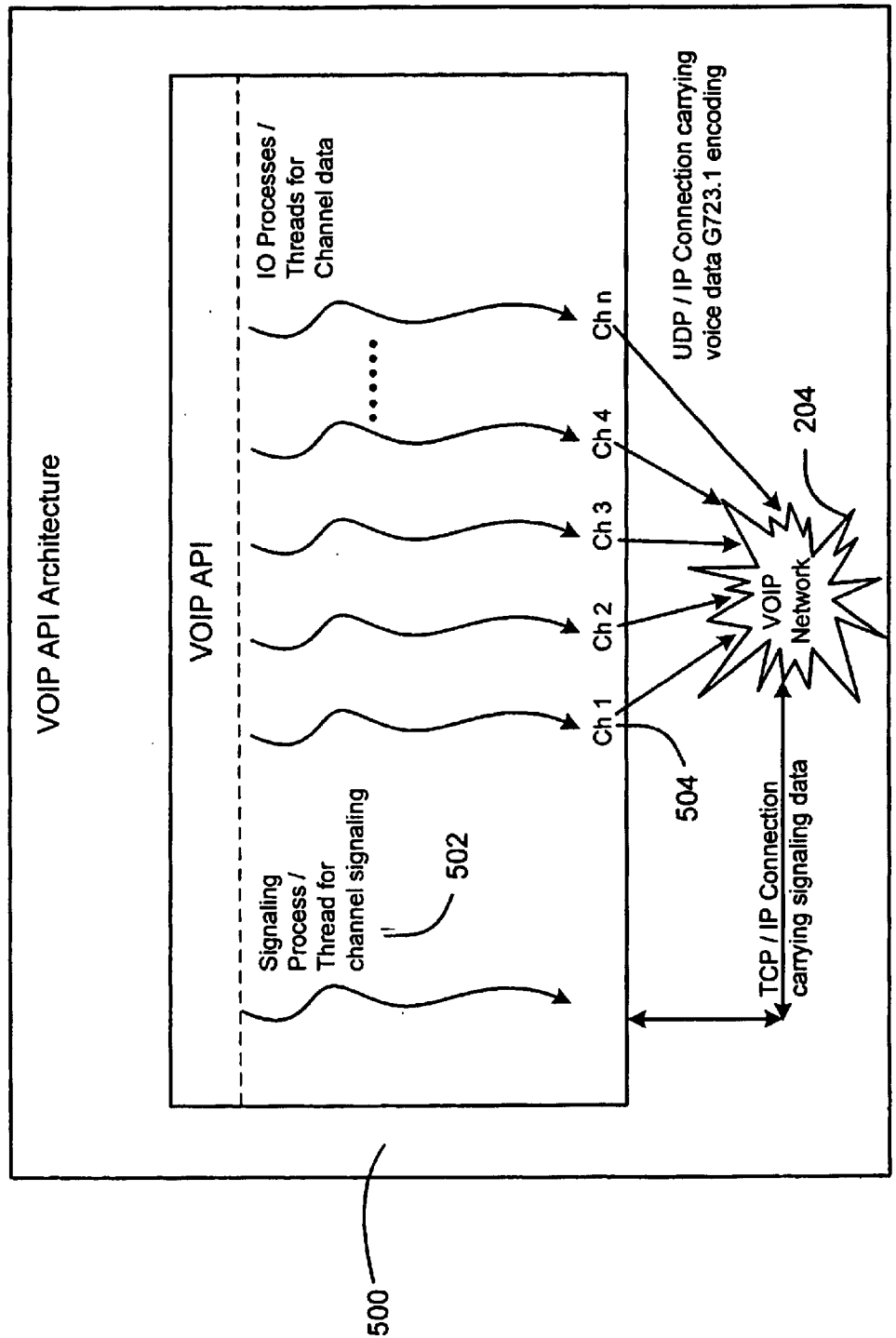
FIG. 5 is a block diagram depicting the architecture of a preferred embodiment of the VOIP API.

When the user of this service dials the access number (1-800-MyYahoo), the signaling thread in a VOIP API 500 as shown in FIG. 5 will receive a TCP/IP signal called "call indicator" indicating that there is an incoming call. VOIP API 500 will notify the application call flow through Yahoo! Telephony API as outlined in FIG. 4. At this point, the application may either accept a call or reject a call. Once the application accepts the call, the signaling thread 502 will find a channel thread 504 that is ready to handle the IO and will setup a UDP connection between a channel IO thread/process 504 and VOIP network 204. All voice, fax data sent from and to the user will go through this UDP connection.

Figure 6:
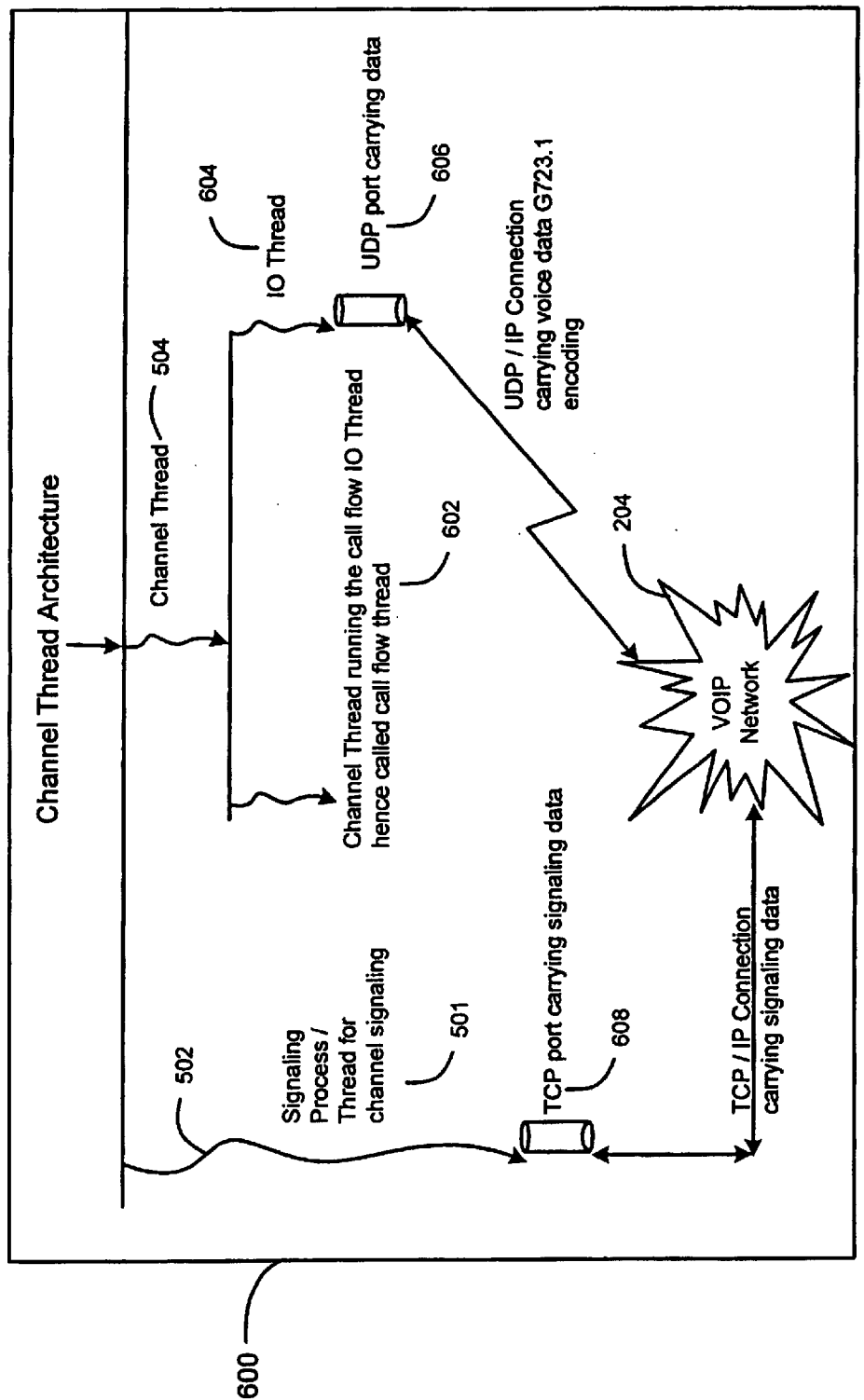
FIG. 6 is a block diagram depicting the architecture of a preferred embodiment of the channel thread.

FIG. 6 is a more detailed depiction of the channel thread architecture 600 according to one embodiment. Signal processing thread 502 is called to handle channel signaling. Thread 502 detect and process DTMF tones and CLI information signal processing thread 502 is connected to VOIP network 204 through a TCP port 608. Channel thread 504 may include a channel thread 602 and IO thread 604. IO thread 604 is connected to VOIP network 204 through a UDP port 606. IO thread 602 processes packets carrying voice data in the native VoIP format.

Figure 7:
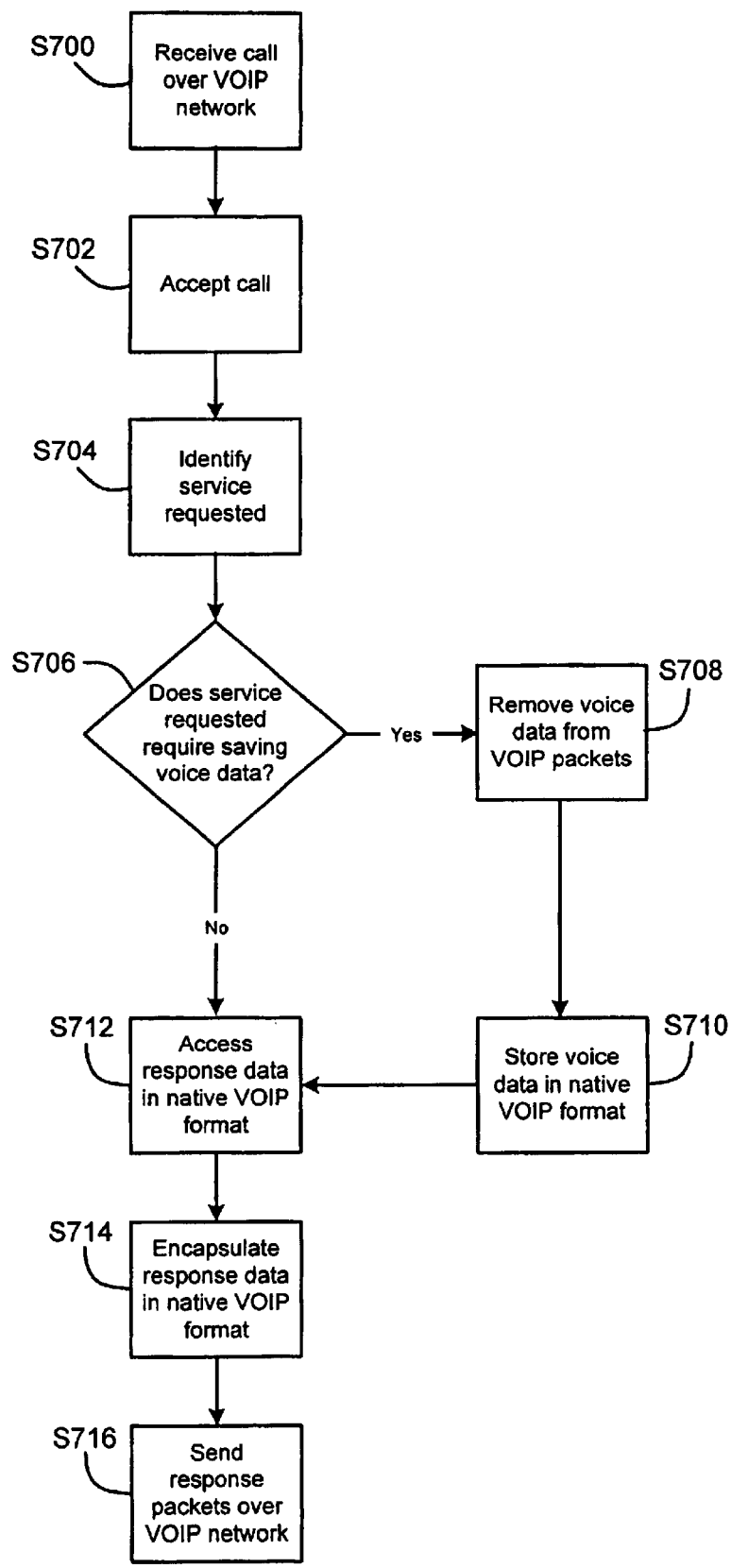
FIG. 7 is a flowchart depicting steps performed to service a request for a service.

An embodiment of the interaction between the telecommunication access server 201 and user is depicted in the flow chart of FIG. 7. In step S700, a call is received over VOIP network 204. In step S702, the call is accepted.

Subsequent to setting up the UDP connection, the thread must determine the type of service requested by the user. (step S704). Two different techniques will be implemented. The first responds to a series of DTMF tones to identify a requested service. For example, the tones generated by pressing "E" (3) followed by "M" (6) could be interpreted to be a request for email services. It is also possible for the application to play a prompt "Press 2 to listen to your email" and the subscriber will indicate its interest by pressing DTMF key "2".

Alternatively, automatic speech recognition services (ASR) may be utilized to determine voice commands such as the user saying "EMAIL". In the present embodiment, ASR utilizes voice data in Pulse Code Modulation (PCM) format so that a voice coder (VC) is utilized to convert speech commands from VoIP format to PCM format. Since only commands are converted to non-native VoIP format in this embodiment the advantage of not decoding all incoming voice data is still substantial.

The process then determines if the service requested requires saving voice data (step S706). If so, voice data is removed from the VOIP package (step S708) and the voice data is stored in a native VOIP format (step S710). The process then proceeds to step S712.

If saving voice data is not required or the voice data was stored in step S710, response data in the native VOIP format is accessed (step S712). The response data is then encapsulated in the native VOIP format (step S714) and response packets are sent over VOIP network 204 (step S716).

Some of the technical challenges that have to be solved in designing such a system include:
 1. Jitter and prompt continuation control
 2. Bi-directional packet streaming

Jitter and Prompt Continuation Control

One of the problems encountered in designing such systems is the jitter and prompt continuation control, i.e. breakup of speech because of pauses/delays in serving voice data to VOIP network 204. To address this problem each of channel threads 504 in gateway access server (GAS) 208 includes a dedicated IO thread maintains a voice continuity buffer that holds voice data for a smooth delivery of concatenated phrases. A concatenated phrase is a voice prompt that is built from two or more individual phrases. For example "You have 10 messages" is built from three phrases "You have"+"10"+"Messages". When this phrase is played there has to be a smoothness and continuity between each of the individual phrases. Having a configurable size look a head continuity buffer in the IO thread provides this functionality.

When the application requests the IO thread to play the phrase "You Have", IO thread plays the phrase till ninety (90) milliseconds before the end. It will then return back to the application and continue to play the remaining 90 ms in the background while the application requests the next play phrase operation for "10". This process repeats till the entire phrase has been played. Further to minimize the delay in accessing the voice data for the phrases, all the phrases are stored in shared memory. In once embodiment a 100 Meg of shared memory was used to hold half a million phrases.

Bi-Directional Packet Streaming

Each of the channels can send as well as receive data from the VOIP network 204 at any given time because telecommunication applications/networks are bi-directional applications. To support this functionality, each of the channels has a dedicated thread, called the IO thread, that manages all the IO. IO thread is designed to provide directional priorities for the data handling based on the application function that is requested.

While playing the phrase or a message, IO thread gives higher priority to data transmission compared to data reception. In this mode, IO thread has to send a voice packet every 30 or 60 or 90 milli-seconds. At the same time it has to read the data from the network 204. While playing voice data, IO thread will always first transmit a voice packet and then block on the select call monitoring for incoming data. If there is any incoming data it will read the data and handle it as required. The select time out is set equivalent to the time when the next voice data has to be transmitted.

While recording a message or while waiting for the data to come in on network 204, IO thread gives higher priority to data reception and does not perform any data transmit operations. In this mode, IO thread blocks in an extended duration time out that is based on the application operation requested and will collect the data as required. For example, if the application requests a message record operation for 30 seconds, then it will block, on the selected system, call for that duration and will collect data as it comes in.

An important aspect of bi-directional packet streaming is that while playing a voice prompt priority is always given to the out-bound data and the remaining time is used to handle the incoming data. While playing a phrase the inbound voice packet must be processed during the time between two out-bound voice packets.

To address the scalability issues, the voice data is handled in the network native format, which in this case is G723.1. This eliminates any need for hardware or software transcoding operations to converting VoIP data into either PCM, Mu-Law and/or A-Law. Because there is no transcoding operation any application that has to store the data such as voice mail messages, must store them in the network native format. This functionality is provided by MAS 302, which stores all of the voice data in the G723.1 format.

The economic advantage of processing and storing data in native VoIP data is significant because no dedicated hardware TICs are required for scalability. For example, a 96 port TIC presently costs about $14,000. If each server (present cost about $3,000) can host two TICs then the cost of a 192 port setup is $31,000 for a cost per port of $161. However, for a completely software-based system, assuming $3,000 per server, the cost of a 216 port setup is $12,000 for a cost per port of $55.55. Further, by using VoIP instead of PSTN, the cost per minute of phone call is reduced from 7 to 10 cents a minute to about 1 cent per minute for a 90% savings. If a projected 500,000 minutes of phone calls are received a day, then the savings are $45,000 per day.

Traditionally, the PCM format is used for playing and storing of messages or voice data. In the preferred embodiment, messages and data are stored in VoIP format, e.g. G.723.1, which is a factor of 10 smaller than the traditional PCM format, resulting in a reduction in storage cost of 90%, GAS 208 has several tens to hundred of thousands of phrases/prompts that may be played to the user of this service. These prompts are stored in a large shared memory in the network native format, i.e. G723.1. All of the processes and threads that run on GAS 208 will attach to the shared memory to use the voice prompts/phrases. This method of storing the phrases/prompts in the shared memory enables the application to use the phrases/prompts with out having any additional time requirements for accessing them. The shared memory can hold several hundred thousands of phrases like the system greetings, company names, city names, letters, numbers, etc. In one embodiment, a half a million phrases are stored in 100 meg of memory and the number of phrases stored in memory, called in-RAM-phrases, can easily be increased by an allocation of more memory.

This architecture eliminates any need for GAS 208 to perform transcoding operation because GAS 208 handles all data operations in the network native CODEC format. GAS 208 uses MAS 302 to store the messages in the network native format.

For users accessing the application using the web, WAS 308 will install a signed plug-in Java applet that can play voice messages in the network native format i.e. G723.1. This makes the message store have a single message format that is small (i.e., about 6.4 Kbps encoded data compared to 64 Kbps or 128 Kbps PCM encoding). The very small encoding size not only helps the message store to be effective, it also enables GAS 208 to handle several number of simultaneous calls coming in from VOIP network 204. One of the embodiment was tested with 96 simultaneous calls being handled by the system purely in software with vast amount of CPU cycles still left for idling indicating that even a higher number of simultaneous calls may be handled.

Figure 8:
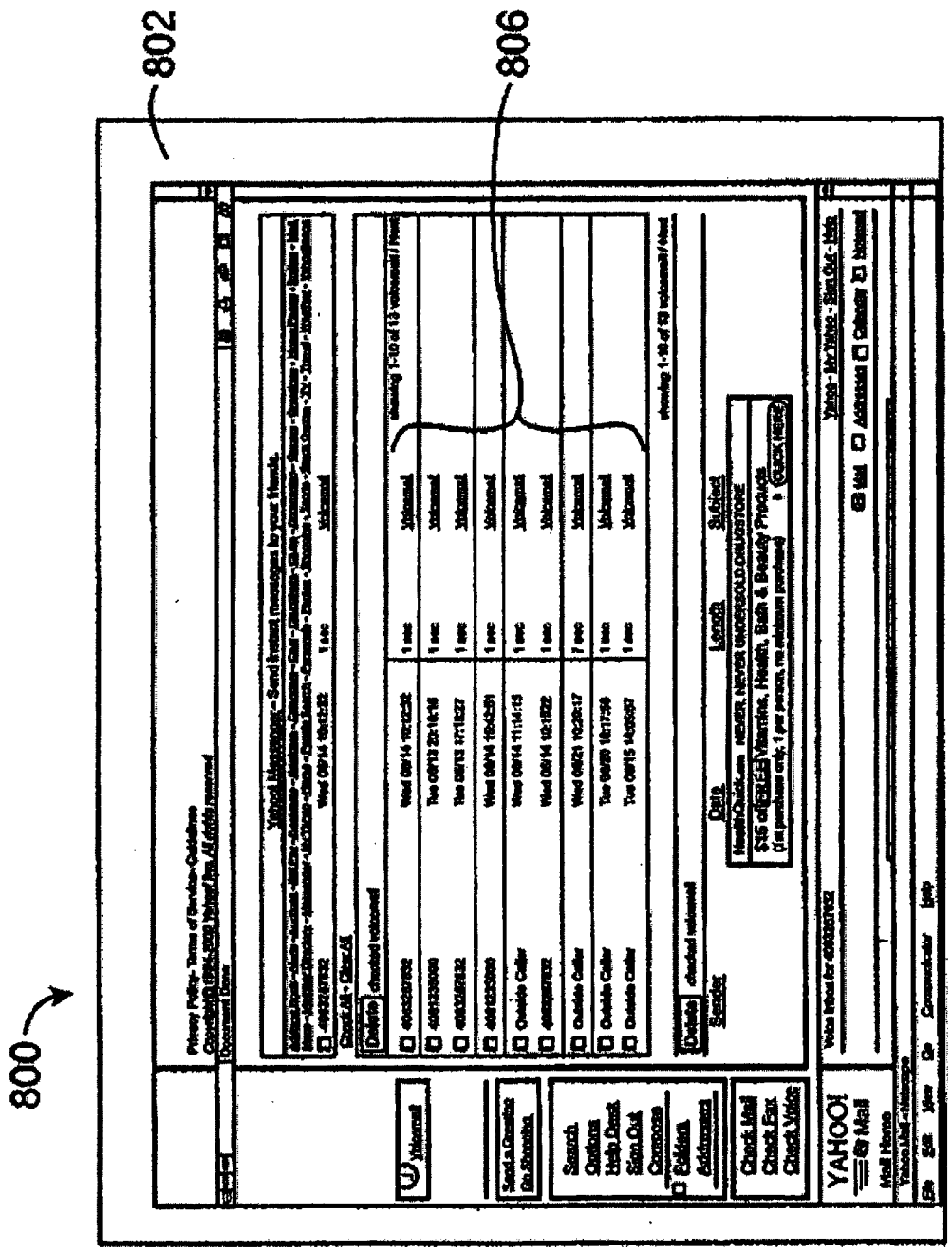
FIG. 8 is a screen shot of a web page listing voicemails messages for a service requestor.
Figure 9:
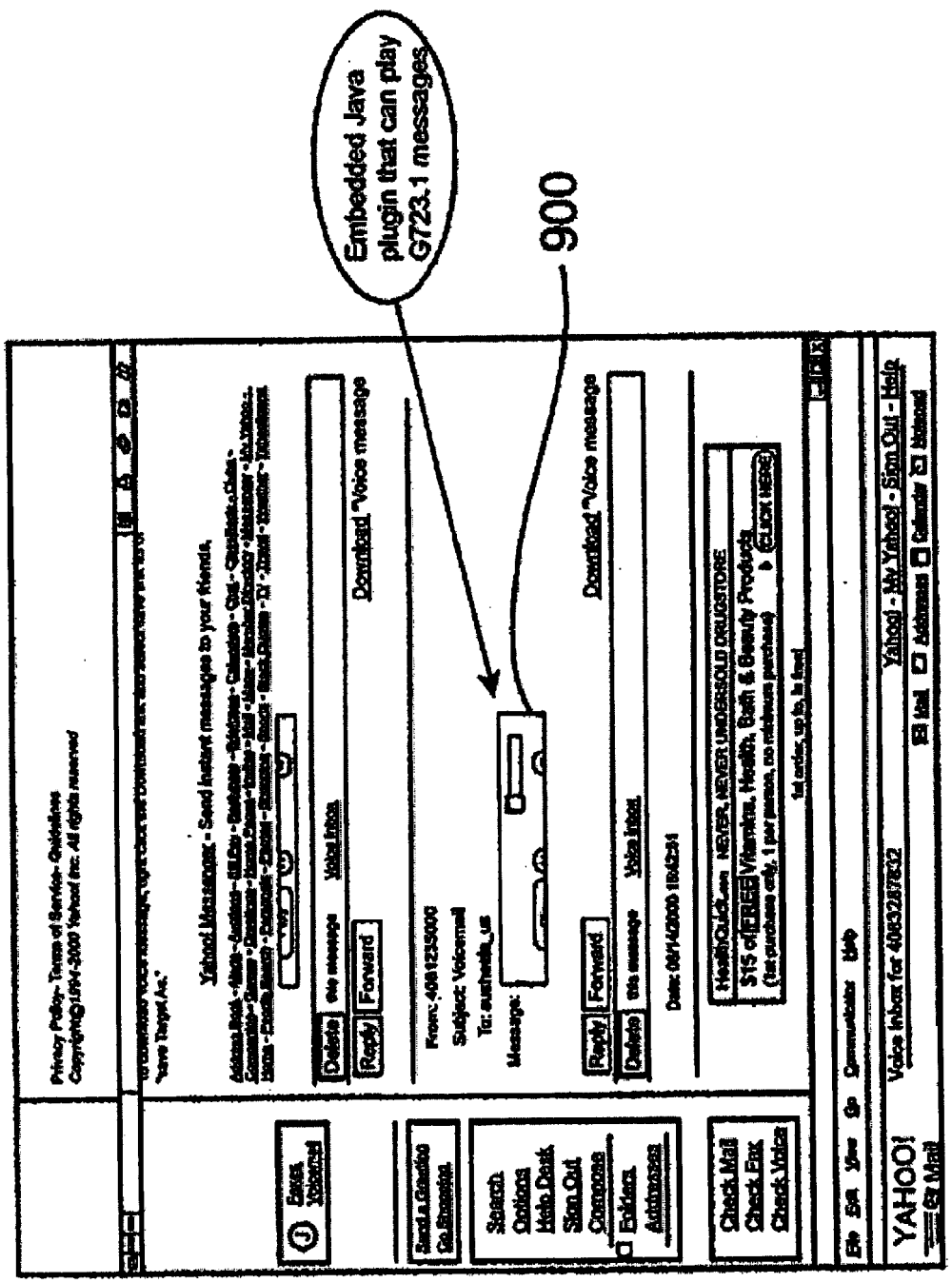
FIG. 9 is a screen shot of a web page implementing an applet for listening to voicemail messages transmitted over the internet in native VoIP format.

A browser interface is depicted in FIGS. 8 and 9. In FIG. 8, the browser 800 displays a web page 802 listing voice mail messages 806 received by the service requestor. In FIG. 9, a signed plug-in Java applet displays controls 900 for listening the voicemail messages stored in native VoIP format.

In one embodiment, the architecture uses some of the products provided by other vendors like the Text To Speech 210 (TTS) and Automatic Speech Recognition 304 (ASR) that operate using standard PCM/A-Law/Mu-Law voice formats. Because of this, a voice coder 306 (VC) is used to perform CODEC conversion between voice formats. VC 306 uses special boards that perform voice format conversion for TTS 210 and ASR 304 resources. Using VC 306 to transcode for limited purposes is much more efficient than transcoding all VoIP data being processed by GAS 208. Analysis has determined that only a small fraction of incoming calls, e.g., about 20%, will require TTS services so that it is much more efficient to transcode only the output of TTS 210 into in VoIP format rather than convert all incoming VoIP to standard PCM/A-Law/Mu-Law voice formats. Therefore, 80% of the conversion between formats is avoided by processing voice data in native VoIP format.

The architecture also enables intelligent information access from the telephone. This intelligence is provided by extracting the integration information from the VOIP signaling protocol that contains the CLI (Calling line ID), i.e. caller ID information, and mapping it to V & H (vertical and horizontal) coordinates and/or city name and/or zip code. This allows the user to be located on a map. The map provides city boundaries. This information is used in selecting default content selection for the user calling for this service. For example a user calling 1-800-MyYahoo from (408) 328-7829 into the system. The system extracts the caller ID information from the VOIP network 204 and this is used to map the user location. Based on the location of the user information like weather, sports, etc. are customized. The user can over ride these customizations by creating a my.yahoo.com account, in which case the defaults will be replaced with the my.yahoo.com customizations/defaults. In case where the information requested for the exact location of the user is not available, then the search will be expanded to provide nearest location for which the requested information is accessed.

Other intelligent defaults may be provided in other contexts. For example, if the user wants to go to a nearest Italian restaurant. A list of closest choices may be created and made available to the user. When a user selects a particular choice, the location of the user is used to provide driving directions to the restaurant of other places of interest. This information may also be used to provide local time zones and time of day information.

As outlined in FIG. 4, GAS 208 includes a VOIP API 400, telephony API 404, and Call Flow 406 according to one embodiment. Call Flow 406 is connected to applications such as a unified messaging application 408, an information retrieval application 410, and other applications 412. The system provides a means for an external applications 402 to be integrated into it by using the YTAP (Yahoo! Telephony Application Protocol) protocol. A particular embodiment enables external applications 402 to be accessed using YTAP by providing a VXML (Voice XML) interface cover over YTAP protocol. This may be used to integrate with external web servers and applications.

Gateway access server 208 (GAS) is capable of providing different classes of service based on the user identification. The mechanism of providing different class of service capabilities enable the system to group users based on service requirements. For example, paid users could get extended message save durations. Additionally, the number of messages per user groups may be based on the class to which they belong.

The invention has now been described with reference to the preferred embodiment. Alternatives and substitutions will now be apparent to persons of skill in the art. For example, the embodiments utilizing the UNIX operating system are described, however other operating system including MS NT and Windows can also be used. The terms threads and processes are utilized to have the widest meaning understood by persons of skill in the art. Different VoIP encoding schemes such as G.726 or CELP encoding may be used.

In one embodiment, the existing yahoo voice services platform is located at Yahoo! premises or at one of its co-location felicities. The telecommunication application server called GAS 208 is currently connected to VOIP network 204. The connection between VOIP network 204 and GAS 208 will carry all of the voice data from the subscriber to the application server.

Further, in the embodiments describe above, when the subscriber calls Yahoo! voice services, VOIP network 204 will send a notification indication to GAS 208, indicating that there is a incoming call. At this point GAS 208 will direct network 204 to answer the call. Once network 204 answers the call, it will send call complete signal to GAS 208. At this point GAS 208 will send voice prompts like "Welcome to Yahoo! etc." Once the call has been established, actual voice data will be sent to VOIP network 204 from GAS 208 and similarly any time the subscriber talks this data will be sent from the network 204 to GAS 208.

Alternatively, in other embodiments, the integrated VOIP system may work with a VOIP network provider to encapsulate the entire Yahoo! voice services architecture into VOIP network 204 and have a control protocol that will control and manage the data using YTAP (Yahoo Telephony Application Protocol).

Accordingly, it is not intended to limit the invention except as provided by the appended claims.

What is claimed is:

1. A method for providing telephone application services using a managed VOIP network, where voice data transmitted over the network is codified in a native VOIP format, said method comprising the acts of:

providing a plurality of channels for handling incoming telephone calls and a shared memory, accessible to all channels, storing response voice data in native VOIP format;

providing an I/O thread for each channel for managing all I/O, with I/O thread performing the following acts:
  while playing a message, giving higher priority to data transmission than to data reception; and
  while recording a message, giving higher priority to data reception than to data transmission;

receiving a first incoming telephone call, including a first plurality of received EP packets encapsulating voice data in native format, from a service requestor over the managed VOIP network;

setting up a connection between the incoming telephone call and a first one of said channels for handling the incoming telephone call;

identifying a requested service;

accessing response voice data, stored in the native VOIP format in said shared memory, responsive to the requested service;

encapsulating said response voice data in a second plurality of response IP packets; and sending said second plurality of response IP packets over said managed VOIP network to the service requestor.

2. The method of claim 1 where said act of identifying a requested service comprises the acts of:

processing voice data in native format, extracted from said received IP packets, to identify a requested service;

extracting voice data from said received IP packets; and performing speech analysis on extracted voice data to identify the service requested.

3. The method of claim 1 where said act of identifying a requested service comprises the acts of:

identifying a DTMF signal;

determining a requested service associated with an identified DTMF signal.

4. The method of claim 1 where said act of accessing response voice data further comprising the acts of:

determining whether said requested service requires text to speech (TTS) conversion;

if so invoking a TTS module that converts text to non-native voice data not in native VOIP format;

converting said non-native voice data to native VOIP format.

5. The method of claim 1 where said act of accessing response voice data further comprising the acts of:

determining whether received voice data will be processed by a speech recognition module;

if so, converting said native VOIP format voice data to non-native format voice data prior to speech recognition.

6. The method of claim 1 further comprising the act of:

extracting calling ID line data from VOIP call signaling protocol to obtain location information about the service requester;

accessing customized voice data, in native VOIP format, from said shared memory;

encapsulating said customized voice data in customized IP packets; and sending said customized IP packets to the service requestor over the managed VoIP network.

7. A method for providing telephone application services using a managed VOIP network, where voice data transmitted over the network is codified in a native VOIP format, said method comprising the acts of:

providing a plurality of channels for handling incoming telephone calls and a shared memory, accessible to all channels, storing response voice data in native VOIP format;

providing a plurality of message access servers for controlling access to shared memory;

receiving a first incoming telephone call, including a first plurality of received IP packets encapsulating voice data in native format, from a service requestor over the managed VOIP network;

setting up a connection between the incoming telephone call and a first one of said channels for handling the incoming telephone call;

identifying a requested service;

utilizing a service requestor ID to access a user database holding an association between the ID and a home MAS for accessing response voice data for the service requestor, wherein the accessed response voice data is stored in the native VOIP format in said shared memory;

encapsulating said response voice data in a second plurality of response IP packets.

* * * * *

UNITED STATES PATENT AND TRADEMARK OFFICE
CERTIFICATE OF CORRECTION

| | |
|---|---|
| PATENT NO. | : 7,095,733 B1 |
| APPLICATION NO. | : 09/658771 |
| DATED | : August 22, 2006 |
| INVENTOR(S) | : Madhu Yarlagadda et al. |

Page 1 of 5

It is certified that error appears in the above-identified patent and that said Letters Patent is hereby corrected as shown below:

In the Application:

Title Page Col. 1 (U.S. Patent Documents), Line 9, After "Nazem et al." insert

-- G06F 17/30 --.

Title Page Col. 2 (Foreign Patent Documents), Line 1, After "12/1999" insert

-- H04M 3/493 --.

Column 1, Line 8, After "Bridging" delete ";" and insert -- (Atty. Docket No. 17887– 007200US); --.

Column 1, Line 9, After "Converter"" delete ";" and insert -- (Atty. Docket No. 17887– 007300US); --.

Column 1, Line 10, After "Architecture"" delete "," and insert -- (Atty. Docket No. 17887–007400US),--.

Column 1, Line 61, Delete "non–real–real–time" and insert -- non–real–time --.

Column 1, Line 66, After "Accordingly" insert -- , --.

Column 1, Line 67, Delete "a" and insert -- as --.

Column 2, Line 7 (Approx.) Delete "visitees" and insert -- visits --.

Column 2, Line 10 (Approx.) Delete "can provide" and insert -- provides --.

Column 2, Line 11, After "information" insert -- , --.

Column 2, Line 15 (Approx.) Delete "an" and insert -- a --.

Column 2, Line 16 (Approx.) After "running" delete "a" and insert -- an --.

Column 2, Line 27, After "messaging" insert -- , --.

Column 2, Line 28, After "model" insert -- . --.

Column 2, Line 33 (Approx.) Delete "can" and insert -- may --.

UNITED STATES PATENT AND TRADEMARK OFFICE
CERTIFICATE OF CORRECTION

PATENT NO.         : 7,095,733 B1
APPLICATION NO. : 09/658771
DATED                  : August 22, 2006
INVENTOR(S)       : Madhu Yarlagadda et al.

It is certified that error appears in the above-identified patent and that said Letters Patent is hereby corrected as shown below:

Column 3, Line 41 (Approx.) After "connect" delete "the".

Column 3, Line 42 (Approx.) After "data in" insert -- a --.

Column 3, Line 42 (Approx.) Delete "which" and insert -- that --.

Column 3, Line 46, Delete "apprecicated" and insert -- appreciated --.

Column 3, Line 48 (Approx.) After "Software on" delete "the".

Column 3, Line 67, Delete "the" and insert -- an --.

Column 4, Line 17 (Approx.) Delete "system. In" and insert -- system, in --.

Column 4, Line 17-18 (Approx.) After "embodiment" insert --,--.
Column 4, Line 20 (Approx.) After "provision" insert -- of --.

Column 4, Line 20 (Approx.) After "where" delete "a".

Column 4, Line 50 (Approx.) After "talk to" delete "the".

Column 4, Line 64 "one of" delete "the".

Column 4, Line 66 Delete "the" and insert -- an --.

Column 5, Line 20, Delete "detcct and process " and insert -- detects and processes --.

Column 5, Line 32, "must determine" and insert -- determines --.

Column 5, Line 32 - 33 Delete "user.(step S704)." And insert -- user (step S704). --.

Column 5, Line 33, Delete "will" and insert -- may --.

Column 5, Line 48 After "embodiment" insert -- , --.

Column 5, Line 52, Delete "package" and insert -- packets --.

Column 6, Line 4, After "thread" insert -- that --.

UNITED STATES PATENT AND TRADEMARK OFFICE
CERTIFICATE OF CORRECTION

PATENT NO. : 7,095,733 B1
APPLICATION NO. : 09/658771
DATED : August 22, 2006
INVENTOR(S) : Madhu Yarlagadda et al.

It is certified that error appears in the above-identified patent and that said Letters Patent is hereby corrected as shown below:

Column 6, Line 11, After "look" insert -- in --.

Column 6, Line 14, After "requests" delete "the".

Column 6, Line 22, Delete "once embodiment" and insert -- one embodiment, --.

Column 6, Line 23, Delete "was" and insert -- is --.

Column 6, Line 25, After "Each of" delete "the".

Column 6, Line 28, After "each of" delete "the".

Column 6, Line 37 (Approx.) After "time" insert --,--.

Column 6, Line 38 (Approx.) After "from" delete "the".

Column 6, Line 51, Delete "call" and insert -- calls --.

Column 6, Line 57, Delete "must be" and insert -- is --.

Column 6, Line 62, Delete "converting" and insert -- convert --.

Column 6, Line 64, After "store" delete "the".

Column 6, Line 65, Delete "must store" and insert -- stores --,

Column 7, Line 5, After "TICs" insert --, --.

Column 7, Line 19, Delete "90%," and insert -- 90%. --.

Column 7, Line 32 (Approx.) Delete "meg" and insert -- Meg--.

Column 7, Line 37, After "perform" insert -- a --.

Column 7, Line 51, Delete "embodiment" and insert -- embodiments --.

Column 7, Line 53, Delete "amount" and insert -- amounts --.

Column 7, Line 55, After "interface" insert -- 800 --.

Column 7, Line 56, After "8," delete "the".

UNITED STATES PATENT AND TRADEMARK OFFICE
CERTIFICATE OF CORRECTION

| | |
|---|---|
| PATENT NO. | : 7,095,733 B1 |
| APPLICATION NO. | : 09/658771 |
| DATED | : August 22, 2006 |
| INVENTOR(S) | : Madhu Yarlagadda et al. |

It is certified that error appears in the above-identified patent and that said Letters Patent is hereby corrected as shown below:

Column 7, Line 59, After "stored in" insert -- the --.

Column 7, Line 62, Delete "like the" and insert -- such as --.

Column 7, Line 65, After "this," delete "a".

Column 8, Line 7, Delete "in" and insert -- a --.

Column 8, Line 22, After "network" delete "204".

Column 8, Line 27, After "In" insert -- the --.

Column 8, Line 37 (Approx.) After "restaurant" delete "of" and insert -- or --.

Column 8, Line 46 (Approx.) Delete "an" and insert -- any --.

Column 8, Line 55, Delete "class" and insert -- classes --.

Column 8, Line 56, Delete "enable" and insert -- enables --.

Column 8, Line 57, Delete "could get" and insert -- may receive --.

Column 9, Line 6, Delete "felicities." and insert -- facilities. --.

Column 9, Line 11, "describe" and insert -- described --.
Column 9, Line 21 (Approx.) After "talks" --,--.

Column 9, Line 21 (Approx.) After "from" delete "the".

Column 9, Line 47, In Claim I, delete "EP" and insert -- IP --.

UNITED STATES PATENT AND TRADEMARK OFFICE
CERTIFICATE OF CORRECTION

PATENT NO. : 7,095,733 B1
APPLICATION NO. : 09/658771
DATED : August 22, 2006
INVENTOR(S) : Madhu Yarlagadda et al.

It is certified that error appears in the above-identified patent and that said Letters Patent is hereby corrected as shown below:

Column 10, Line 30, In Claim 6, delete "requester;" and insert -- requestor; --.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,095,733 B1  
APPLICATION NO. : 09/658771  
DATED : August 22, 2006  
INVENTOR(S) : Madhu Yarlagadda et al.

It is certified that error appears in the above-identified patent and that said Letters Patent is hereby corrected as shown below:

On the title page: Item [56]

Title Page Col. 1 (U.S. Patent Documents), Line 9, After "Nazem et al." insert

-- G06F 17/30 --.

Title Page Col. 2 (Foreign Patent Documents), Line 1, After "12/1999" insert

-- H04M 3/493 --.

Column 1, Line 8, After "Bridging" delete ";" and insert -- (Atty. Docket No. 17887– 007200US); --.

Column 1, Line 9, After "Converter"" delete ";" and insert -- (Atty. Docket No. 17887– 007300US); --.

Column 1, Line 10, After "Architecture"" delete "," and insert -- (Atty. Docket No. 17887– 007400US), --.

Column 1, Line 61, Delete "non–real–real–time" and insert -- non–real–time --.

Column 1, Line 66, After "Accordingly" insert -- , --.

Column 1, Line 67, Delete "a" and insert -- as --.

Column 2, Line 7 (Approx.) Delete "visitees" and insert -- visits --.

Column 2, Line 10 (Approx.) Delete "can provide" and insert -- provides --.

Column 2, Line 11, After "information" insert -- , --.

Column 2, Line 15 (Approx.) Delete "an" and insert -- a --.

Column 2, Line 16 (Approx.) After "running" delete "a" and insert -- an --.

Column 2, Line 27, After "messaging" insert -- , --.

Column 2, Line 28, After "model" insert -- . --.

Column 2, Line 33 (Approx.) Delete "can" and insert -- may --.

UNITED STATES PATENT AND TRADEMARK OFFICE
CERTIFICATE OF CORRECTION

PATENT NO.       : 7,095,733 B1
APPLICATION NO.  : 09/658771
DATED            : August 22, 2006
INVENTOR(S)      : Madhu Yarlagadda et al.

It is certified that error appears in the above-identified patent and that said Letters Patent is hereby corrected as shown below:

Column 3, Line 41 (Approx.) After "connect" delete "the".

Column 3, Line 42 (Approx.) After "data in" insert -- a --.

Column 3, Line 42 (Approx.) Delete "which" and insert -- that --.

Column 3, Line 46, Delete "apprecicated" and insert -- appreciated --.

Column 3, Line 48 (Approx.) After "Software on" delete "the".

Column 3, Line 67, Delete "the" and insert -- an --.

Column 4, Line 17 (Approx.) Delete "system. In" and insert -- system, in --.

Column 4, Line 17-18 (Approx.) After "embodiment" insert --,--.
Column 4, Line 20 (Approx.) After "provision" insert -- of --.

Column 4, Line 20 (Approx.) After "where" delete "a".

Column 4, Line 50 (Approx.) After "talk to" delete "the".

Column 4, Line 64 "one of" delete "the".

Column 4, Line 66 Delete "the" and insert -- an --.

Column 5, Line 20, Delete "detect and process" and insert -- detects and processes --.

Column 5, Line 32, "must determine" and insert -- determines --.

Column 5, Line 32 - 33 Delete "user.(step S704)." And insert -- user (step S704). --.

Column 5, Line 33, Delete "will" and insert -- may --.

Column 5, Line 48 After "embodiment" insert -- , --.

Column 5, Line 52, Delete "package" and insert -- packets --.

Column 6, Line 4, After "thread" insert -- that --.

Column 6, Line 11, After "look" insert -- in --.

UNITED STATES PATENT AND TRADEMARK OFFICE
CERTIFICATE OF CORRECTION

PATENT NO. : 7,095,733 B1
APPLICATION NO. : 09/658771
DATED : August 22, 2006
INVENTOR(S) : Madhu Yarlagadda et al.

It is certified that error appears in the above-identified patent and that said Letters Patent is hereby corrected as shown below:

Column 6, Line 14, After "requests" delete "the".

Column 6, Line 22, Delete "once embodiment" and insert -- one embodiment, --.

Column 6, Line 23, Delete "was" and insert -- is --.

Column 6, Line 25, After "Each of" delete "the".

Column 6, Line 28, After "each of" delete "the".

Column 6, Line 37 (Approx.) After "time" insert --,--.

Column 6, Line 38 (Approx.) After "from" delete "the".

Column 6, Line 51, Delete "call" and insert -- calls --.

Column 6, Line 57, Delete "must be" and insert -- is --.

Column 6, Line 62, Delete "converting" and insert -- convert --.

Column 6, Line 64, After "store" delete "the".

Column 6, Line 65, Delete "must store" and insert -- stores --.

Column 7, Line 5, After "TICs" insert --, --.

Column 7, Line 19, Delete "90%," and insert -- 90%. --.

Column 7 Line 32 (Approx.) Delete "meg" and insert -- Meg--.

Column 7, Line 37, After "perform" insert -- a --.

Column 7, Line 51, Delete "embodiment" and insert -- embodiments --.

Column 7, Line 53, Delete "amount" and insert -- amounts --.

Column 7, Line 55, After "interface" insert -- 800 --.

Column 7, Line 56, After "8," delete "the".

Column 7, Line 59, After "stored in" insert -- the --.

UNITED STATES PATENT AND TRADEMARK OFFICE
CERTIFICATE OF CORRECTION

PATENT NO.       : 7,095,733 B1
APPLICATION NO. : 09/658771
DATED            : August 22, 2006
INVENTOR(S)      : Madhu Yarlagadda et al.

It is certified that error appears in the above-identified patent and that said Letters Patent is hereby corrected as shown below:

Column 7, Line 62, Delete "like the" and insert -- such as --.

Column 7, Line 65, After "this," delete "a".

Column 8, Line 7, Delete "in" and insert -- a --.

Column 8, Line 22, After "network" delete "204".

Column 8, Line 27, After "In" insert -- the --.

Column 8, Line 37 (Approx.) After "restaurant" delete "of" and insert -- or --.

Column 8, Line 46 (Approx.) Delete "an" and insert -- any --.

Column 8, Line 55, Delete "class" and insert -- classes --.

Column 8, Line 56, Delete "enable" and insert -- enables --.

Column 8, Line 57, Delete "could get" and insert --may receive --.

Column 9, Line 6, Delete "felicities." and insert -- facilities. --.

Column 9, Line 11, "describe" and insert -- described --.

Column 9, Line 21 (Approx.) After "talks" should read --,--.
Column 9, Line 21 (Approx.) After "from" delete "the".

Column 9, Line 47, In Claim 1, delete "EP" and insert -- IP --.

UNITED STATES PATENT AND TRADEMARK OFFICE
CERTIFICATE OF CORRECTION

PATENT NO. : 7,095,733 B1
APPLICATION NO. : 09/658771
DATED : August 22, 2006
INVENTOR(S) : Madhu Yarlagadda et al.

It is certified that error appears in the above-identified patent and that said Letters Patent is hereby corrected as shown below:

Column 10, Line 30, In Claim 6, delete "requester;" and insert -- requestor; --.

Signed and Sealed this

Twenty-second Day of May, 2007

JON W. DUDAS
*Director of the United States Patent and Trademark Office*